United States Patent [19]

Breyer

[11] Patent Number: 4,914,333
[45] Date of Patent: Apr. 3, 1990

[54] ELECTROMOTOR BELT DRIVE ADJUSTMENT ASSEMBLY

[75] Inventor: Eberhard Breyer, Bad Neustadt, Fed. Rep. of Germany

[73] Assignee: Siemens Aktiengesellschaft, Berlin & Munich, Fed. Rep. of Germany

[21] Appl. No.: 315,719

[22] Filed: Feb. 24, 1989

[30] Foreign Application Priority Data

Feb. 26, 1988 [DE] Fed. Rep. of Germany ....... 3806172

[51] Int. Cl.$^4$ ............................................ H02K 15/26
[52] U.S. Cl. ....................................... 310/91; 248/666; 310/112
[58] Field of Search ................... 248/665, 666; 310/91, 310/80, 112, 113, 114

[56] References Cited

U.S. PATENT DOCUMENTS

| | | |
|---|---|---|
| 1,694,868 | 12/1928 | Sawyer . |
| 2,235,972 | 3/1941 | Zimmerman ........................ 248/665 |
| 2,286,482 | 6/1942 | Freed ...................................... 248/20 |
| 2,367,601 | 1/1945 | Nicol ................................... 248/666 |

FOREIGN PATENT DOCUMENTS 2499208 8/1982 France .
739235 10/1955 United Kingdom .
1067347 5/1967 United Kingdom .

*Primary Examiner*—Patrick R. Salce
*Assistant Examiner*—D. L. Rebsch
*Attorney, Agent, or Firm*—Kenyon & Kenyon

[57] ABSTRACT

An assembly comprising an electric motor that is coupled to an operating machine by a belt in which the electric motor is fastened so that its shaft is parallel to the shaft of the operating machine. The motor is supported by a base plate that is mounted on a cantilever so as to be able to tilt horizontally when being adjusted with at least one adjusting bolt to aid in tightening the belt that connects the operating machine and the electric motor. A one piece intermediate part that has two side pieces that enclose an angle is fastened to the cantilever at the free ends of the side pieces. The base plate is fastened to the intermediate piece in the region where the side pieces join. One side piece extends in the direction of the base plate. The longitudinal extension of the other side piece between the joining region and the cantilever is dimensioned so that the strength and yield point of the material allows the required tilting motion of the base plate to occur.

10 Claims, 1 Drawing Sheet

ELECTROMOTOR BELT DRIVE ADJUSTMENT ASSEMBLY

BACKGROUND OF THE INVENTION

The present invention relates to an assembly comprising an electric motor that is coupled to an operating machine by a belt. The electric motor is fastened on a base plate. The shaft of the motor is parallel to the shaft of the machine it drives. The base plate and electric motor can tilt vertically on a cantilever that connects the machine and the electric motor. At least one bolt allows for adjusting the position of the base plate to tighten the belt.

The assemblies of this type that are known in the market provide bearing lugs on the base plate that supports the electric motor on the cantilever. The bearing lugs are bored through coaxially and mounted by a bearing bolt to form a joint. High manufacturing precision is required in boring the bearing lugs to achieve the necessary parallel alignment between the motor shaft and the driving shaft of the machine. Moreover, the play in the fitting between the bores of the bearing lugs and the bearing bolts must be kept small in order to suppress as much of the noise caused by machine vibrations at the rotation frequency as possible.

SUMMARY OF THE INVENTION

The present invention forms an assembly of the type described above in such a way that the shafts of the motor and the machine can be aligned parallel and noise suppressed by fastening the electric motor in a way that is structurally simplified.

The solution accomplished by the present invention provides an intermediate part that is formed as a single piece and adapted to the length of the base plate. The intermediate part has two side pieces that are connected with each other at an angle. The free ends of both side pieces are fastened to the cantilever. The base plate is connected with one side piece that extends in the direction of the base plate in the region where the two side pieces are joined or connected. Furthermore, the longitudinal extent of the other side piece from the point where the two side pieces are joined to its connection site on the cantilever is so dimensioned that the required swinging motion of the base plate can be carried out within the strength and yield point constraints of the material. The intermediate part can be oriented on the cantilever to achieve the necessary parallel alignment between shafts. The dimensions of the other side piece and the elasticity of its material described above permit the intermediate part to tilt vertically within given limits so that the position of the electric motor can be changed, to thereby regulate the tension of the belt. No noise problems of any kind result, such as are present in previous machines because the two side pieces are firmly connected. Connecting the two side pieces at an acute angle increases elasticity so that the intermediate part is easier to swing.

The intermediate part can advantageously comprise a single sheet of metal or several sheets of metal that are arranged in layers. This construction supplies the flexibility required at the place where the two side pieces connect without requiring that the connecting site be formed specifically for this purpose.

The intermediate part can be securely fastened on the cantilever by compressing the free ends of the two side pieces between pressure strips and the walls of the cantilever. At the point of connection the free ends of the side pieces extend perpendicular and are fastened to perpendicular or nearly perpendicular portions of the cantilever walls with bolts that extend through the side pieces and the walls of the cantilever and are threaded into the pressure strips. Fastening the side pieces to the perpendicular cantilever walls facilitates obtaining a parallel alignment of the motor and machine shaft. It is also advantageous if the fastening holes for inserting the bolts through the free ends of the side pieces have a greater diameter than the bolts. The intermediate part can thus be aligned appropriately when the bolts are loosened and can be held under compression on the cantilever by tightening the bolts.

DETAILED DESCRIPTION

Figure 1:
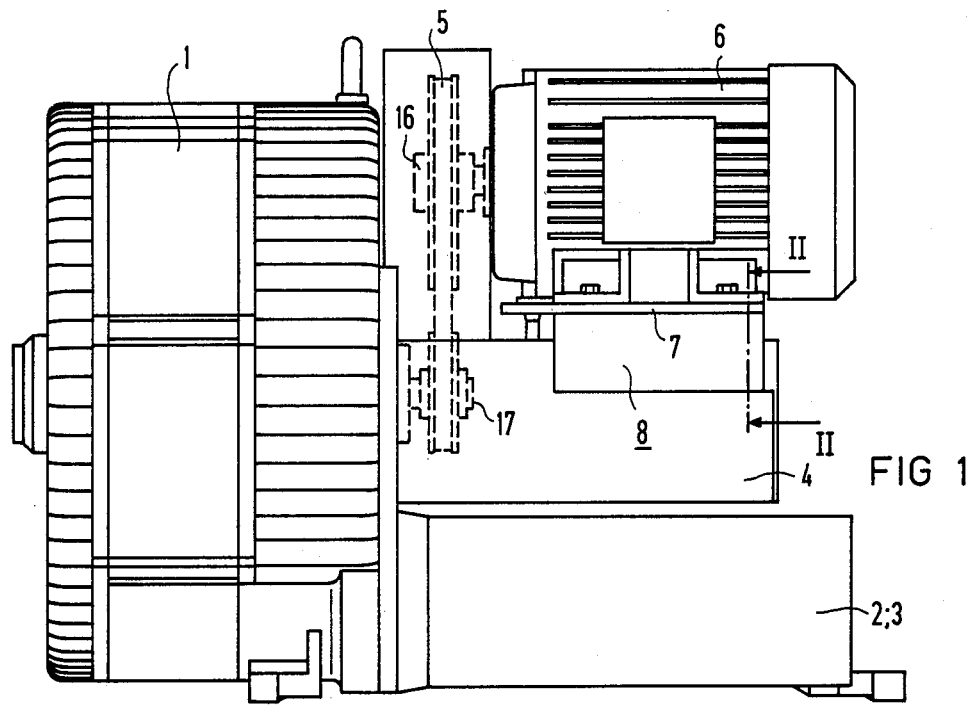
FIG. 1 shows a cross-section of the assembly comprising a compressor and an electric motor.

FIG. 1 illustrates a compressor 1 having inlet and outlet connecting pieces 2 and 3 in its housing. A cantilever 4 is flanged onto the housing above the inlet and outlet connecting pieces 2 and 3. Cantilever 4 supports an electric motor 6 that drives the compressor with a belt 5. The electric motor 6 is mounted to cantilever 4 using a base plate 7 to which motor 6 is connected. The base plate 7, in turn, is mounted to an intermediate part 8 which is connected to the cantilever 4 in such a manner as to have the ability to tilt, or swing.

Figure 2:
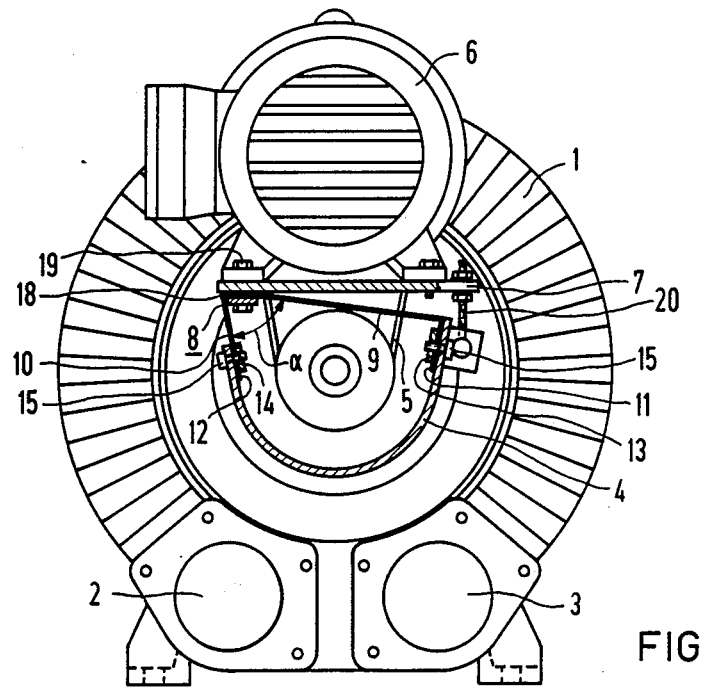
FIG. 2 shows a front view of the motor side of the assembly in a partial cross-section along the line II—II shown in FIG. 1.

FIG. 2 shows that the intermediate part 8 is formed such as to have two side pieces 9 and 10 that enclose an acute angle. Side piece 9 extends in the direction of base plate 7. Its free end 11, which is bent so as to form an angle with the main part of side piece 9, is fastened to one side on the wall of cantilever 4 at a place where the wall is nearly perpendicular. Analogously, side piece 10 has a free end 12 on the opposite side that is likewise fastened to a part of the wall of cantilever 4 which is nearly perpendicular. Pressure strips 13 and 14 overlay the free ends 11 and 12 of side pieces 9 and 10. Bolts 15 extend through the wall of cantilever 8 and holes in the respective ends 11 and 12 of side pieces 9 and 10 and thread into pressure strips 13 and 14 to fasten the ends 11 and 12 to the walls of cantilever 4. The fastening holes provided for inserting bolts 15 through the free ends 11 and 12 have a greater diameter than bolts 15. This allows the intermediate part 8 to be appropriately adjusted to achieve parallel alignment between shaft 16 of the electric motor and the driving shaft 17 of the compressor. Fastening the side piece ends 11 and 12 to the walls of cantilever 4 at a point where the walls are perpendicular or nearly perpendicular provides a simple way to adjust the height as necessary to make the motor and machine shaft parallel.

It is necessary to be able to install belt(s) 5, typically V-belts connected to shafts 16 and 17, on the pulleys, to remove them from the pulleys and to adjust the tension of the belts as desired without difficulties. In order to be able to do this, base plate 7 has its one side fastened to the intermediate piece 8, in the region of the site 18 where side pieces 9 and 10 join, by means of a nut and bolt connection 19. Its other side is connected to cantilever 8 by means of an adjusting nut and bolt arrangement 20 which permits a limited tilting motion.

The length of the side piece 10 depends on the strength and yield point of the material used to achieve the desired angle of rotation (swing). Side piece 9 functions as transverse control arm and stabilizes the position of the intermediate part 8. The present invention thus provides both for easy adjustment of the intermediate part 8 and for a stable fastening of the electric motor 6 to cantilever 4.

What is claimed is:

1. An assembly, comprising:

an operating machine having a machine shaft;

a cantilever extending from the operating machine;

a one-piece intermediate part comprising first and second side pieces that join at an angle at a connecting site, and being made of a material having a known strength and yield point, the first side piece having a first free end connected to the cantilever, the second side piece having a second free end connected to the cantilever;

an electric motor having a motor shaft;

a base plate fastened to the first side piece in the region of the connecting site for supporting the base plate substantially perpendicular to a plane containing machine shaft and the motor shaft and allowing for the base plate to tilt and to change the distance between the motor shaft and machine shaft;

the electric motor being mounted on said base plate with its shaft parallel to the shaft of the operating machine;

a belt coupling the motor shaft to the machine shaft;

at least one adjusting bolt for adjusting the base plate to control the tension of the belt; and the first side piece extending in the direction of the base plate, and having a length adapted to the length of the base plate and the longitudinal extension of the second side piece from the cantilever to the connecting side dimensioned such that the vertical swinging motion does not exceed the strength and yield point of the material.

2. An assembly as claimed in claim 1, wherein the two side pieces connect with each other at an acute angle.

3. An assembly as claimed in claim 1, wherein the intermediate part comprises sheet metal.

4. An assembly as claimed in claim 3, wherein the intermediate part comprises several layers of metal sheets.

5. An assembly as claimed in claim 2, wherein the intermediate part comprises sheet metal.

6. An assembly as claimed in claim 5, wherein the intermediate part comprises several layers of metal sheets.

7. An assembly as claimed in claim 1, further comprising pressure strips, the free ends of the two side pieces disposed between the pressure strips and walls of the cantilever that extend perpendicular or nearly perpendicular, and bolts compressing the free ends between the walls and the pressure strips.

8. An assembly as claimed in claim 7, wherein the free ends of the side pieces have fastening holes for the bolts, the fastening holes having a greater diameter than the bolts.

9. An assembly as claimed in claim 2, further comprising pressure strips, the fee ends of the two side pieces disposed between the pressure strips and walls of the cantilever that extend perpendicular or nearly perpendicular, and bolts compressing the free ends between the walls and the pressure strips.

10. An assembly as claimed in claim 9, wherein the free ends of the side pieces have fastening holes for the bolts, the fastening holes having a greater diameter than the bolts.

* * * * *